United States Patent
Weber et al.

(10) Patent No.: US 9,566,989 B2
(45) Date of Patent: *Feb. 14, 2017

(54) RAILWAY SAFETY CRITICAL SYSTEMS WITH TASK REDUNDANCY AND ASYMMETRIC COMMUNICATIONS CAPABILITY

(71) Applicant: Siemens Industry, Inc., Alpharetta, GA (US)

(72) Inventors: Claus Weber, Eastchester, NY (US); Zoltan Egel, New York, NY (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/958,213

(22) Filed: Dec. 3, 2015

(65) Prior Publication Data

US 2016/0082994 A1 Mar. 24, 2016

Related U.S. Application Data

(63) Continuation of application No. 14/254,332, filed on Apr. 16, 2014, now Pat. No. 9,233,698, which is a
(Continued)

(51) Int. Cl.
*B60W 50/02* (2012.01)
*B61L 27/04* (2006.01)
(Continued)

(52) U.S. Cl.
CPC ............... *B61L 27/04* (2013.01); *B61L 23/00* (2013.01); *G06F 11/0796* (2013.01);
(Continued)

(58) Field of Classification Search
USPC ... 700/2, 3, 4, 19, 20, 24; 246/2 R, 3, 4, 20, 246/21, 22, 23, 24, 27, 28 R, 122 R, 131, 246/133, 134, 135, 218, 219, 220
See application file for complete search history.

(56) References Cited

U.S. PATENT DOCUMENTS

5,685,507 A * 11/1997 Horst ..................... B61L 3/126
246/187 A
6,135,396 A * 10/2000 Whitfield ............... B61L 3/125
246/167 R
(Continued)

*Primary Examiner* — Thomas Tarcza
*Assistant Examiner* — Richard Goldman (57) ABSTRACT

A railway safety critical application system substitutes commercial off-the-shelf (COTS) hardware and/or software for railway-domain specific product components, yet is validated to conform to railway safety critical system failure-free standards. The safety critical system uses a pair of tasks executed on a controller of a COTS personal computer or within a virtual environment with asymmetric communications capability. Both tasks receive and verify safety critical systems input message data and security code integrity and separately generate output data responsive to the input message. The first task has sole capability to send complete safety critical system output messages, but only the second task has the capability of generating the output security code. A failure of any of systems hardware, software or processing capability results failure to transmit a safety critical system output message or an output message that cannot be verified by other safety critical systems.

20 Claims, 6 Drawing Sheets

Related U.S. Application Data continuation-in-part of application No. 13/608,313, filed on Sep. 10, 2012, now Pat. No. 8,714,494.

(51) Int. Cl.
    *B61L 23/00*     (2006.01)
    *G06F 11/07*     (2006.01)
    *G06F 11/14*     (2006.01)

(52) U.S. Cl.
    CPC ...... *G06F 11/1479* (2013.01); *G06F 11/1497* (2013.01); *B61L 2201/00* (2013.01)

(56) References Cited

U.S. PATENT DOCUMENTS

| | | | | |
|---|---|---|---|---|
| 6,463,337 B1* | 10/2002 | Walker | ...................... | B61L 1/20 246/167 D |
| 6,788,980 B1* | 9/2004 | Johnson | ............... | G05B 19/042 700/1 |
| 7,020,532 B2* | 3/2006 | Johnson | ............... | G05B 19/042 700/1 |
| 7,328,369 B2* | 2/2008 | Manoni | ................... | B61L 17/00 714/11 |
| 7,487,075 B2* | 2/2009 | Martin | ................. | G05B 19/052 703/13 |
| 7,577,502 B1* | 8/2009 | Henry | ..................... | B61L 5/102 246/218 |
| 7,966,126 B2* | 6/2011 | Willis | ..................... | B61L 25/025 340/988 |
| 8,028,961 B2* | 10/2011 | Ashraf | ................... | B61L 29/28 246/167 R |
| 8,069,367 B2* | 11/2011 | Golowner | ................ | G05B 9/03 714/11 |
| 8,200,380 B2* | 6/2012 | Ghaly | ..................... | B61L 3/008 701/19 |
| 8,214,092 B2* | 7/2012 | Ghaly | ..................... | B61L 19/06 246/131 |
| 8,228,946 B2* | 7/2012 | Hao | .................. | H04L 12/40189 370/445 |
| 8,407,512 B2* | 3/2013 | Kydles | ....................... | G06F 1/14 710/300 |
| 8,469,319 B2* | 6/2013 | Kiss, Jr. | .................. | B61L 29/24 246/125 |
| 8,469,320 B2* | 6/2013 | Baldwin | ................. | B61L 29/28 246/130 |
| 8,549,352 B2* | 10/2013 | Kranz | ................ | G05B 19/0428 714/10 |
| 2005/0223288 A1* | 10/2005 | Berbaum | ................ | G06F 11/27 714/29 |
| 2005/0223290 A1* | 10/2005 | Berbaum | ................ | G06F 11/27 714/30 |
| 2007/0033511 A1* | 2/2007 | Davies | ................ | G06F 11/1675 714/799 |
| 2007/0240028 A1* | 10/2007 | Davies | ................ | G06F 11/1675 714/799 |
| 2009/0184210 A1* | 7/2009 | Groves, Jr. | ............. | B61L 19/16 246/3 |
| 2010/0312461 A1* | 12/2010 | Haynie | ................. | B61L 25/025 701/117 |
| 2011/0238239 A1* | 9/2011 | Shuler | .................... | G06F 9/5077 701/3 |
| 2012/0030524 A1* | 2/2012 | Schmid | ................. | G06F 11/187 714/49 |
| 2013/0060526 A1* | 3/2013 | Geiger | ................ | G06F 11/1641 702/186 |
| 2013/0170498 A1* | 7/2013 | Danielsson | ......... | H04L 12/4015 370/400 |
| 2013/0254442 A1* | 9/2013 | Robillard | ................ | G06F 21/85 710/107 |
| 2013/0277506 A1* | 10/2013 | Baldwin | ................ | B61L 29/28 246/473.1 |
| 2013/0339755 A1* | 12/2013 | Gallois | ................... | G06F 21/64 713/190 |

\* cited by examiner

RAILWAY SAFETY CRITICAL SYSTEMS WITH TASK REDUNDANCY AND ASYMMETRIC COMMUNICATIONS CAPABILITY

BACKGROUND OF THE DISCLOSURE

1. Field of the Invention

The invention relates to railway control safety critical systems. More particularly, the present invention relates to control systems in railway safety critical application systems with low hazard rates, as is needed in the railway industry. Railway safety critical application systems ("safety critical systems") include by way of non-limiting example train management systems, back office server, onboard units for automatic intervention if a train exceeds safeguarded speed limits, data recorders that record operational information, train speed and position determination equipment, brake and throttle control, sub-system status and diagnostics, wireless data communications exchanged between trackside/landside and train side (e.g., via wireless radio communications) and train crew communications. As used herein, the term "train" is a locomotive alone, locomotive with cars, or an integrated locomotive/car vehicle, (e.g., light rail or subway).

2. Description of the Prior Art

Railway trains are equipped with safety critical systems that are required to have high availability and low hazard rates (a "hazard" is commonly understood as "physical situation with a potential for human injury and/or damage to environment" (IEC 62278)). "Railway operators and governmental regulators often require exceedingly low hazard rates that satisfy their high demand for operational safety."). Safety critical systems are typically operated with electronic control systems. Over time those systems are gravitating to processor or controller operated digital electronic systems that communicate with each other over one or more communications data buses.

In order to meet railway safety objectives, control system hardware is often of proprietary dedicated design with documented testing and validation. Digital electronic controller operating systems and application software are also validated. Electronic data communications utilize validated security codes for data integrity checks, such as hash codes or cryptographic attachments, in order to assure data integrity upon transmission between the systems. Validation processes require time and expense. Given the relatively limited demand and sales volume of railway safety critical systems, as compared to demand for general commercial and consumer electronics (e.g., personal computer hardware, software and operating systems), the railway safety critical systems controllers and related equipment are expensive to manufacture and have longer product lifecycles than those sold in the general electronics applications fields.

However, consumer and commercial personal computers (PC's) cannot be directly substituted for existing railway safety critical systems control systems. PC's are often only having a data failure rate of no more than $10^{-4}$ per operational hour, which is insufficient to meet railway systems required hazard. Additionally, PC commercial operating system software is not validated for use in railway safety critical systems.

There is a need in the railway industry to replace railway-domain specific proprietary design safety critical system control system hardware and operating system software with more readily available general purpose commercial off the shelf ("COTS") products, where feasible. Substitution of COTS subsystems for railway-domain specific proprietary design subsystems potentially can simplify overall system design, shorten system design cycles, and allow the railway safety critical system prime supplier to focus its efforts on overall system application and integration issues, where it has greater expertise than general consumer or COTS electronics sub-vendors.

There is also a need in the railway industry to reduce safety critical system control system procurement costs and increase the number of qualified sub-vendors by substituting COTS products for railway-domain specific products, when validation of the substitutes is cost effective. The railway customer and safety critical system prime supplier may also benefit from outsourcing design and manufacture of subsystem components to sub-vendors whom may have broader design expertise for their respective commercial components.

There is an additional need in the railway industry to streamline safety critical system procurement timelines by simplifying and aggregating validation procedures. For example, if commercial off-the-shelf (COTS) control system hardware and software components already meet recognized and documented reliability validation standards; there may be no need to revalidate those same products for railway critical system applications. Rather, the safety critical system validation may be consolidated and simplified by a general system validation process that includes contributions of already validated commercial off-the-shelf products, thereby streamlining procurement timelines and processes.

SUMMARY OF THE INVENTION

Accordingly, an object of the present invention is to simplify railway safety critical systems overall design by replacing proprietary design safety critical system control system hardware and operating system software with more readily available non-proprietary commercial products.

It is also an object of the present invention to reduce safety critical system control system procurement costs and increase the number of qualified sub-vendors whom may have broader design expertise in their respective commercial product lines by substituting non-proprietary products for proprietary products when validation for the substitutes is cost effective.

An additional object of the present invention is to streamline safety critical system control system procurement costs and validation timelines, as well as increase the number of qualified vendors by simplifying and aggregating validation procedures.

These and other objects are achieved in accordance with the present invention by a control system for a railway safety critical application system ("safety critical system") and method for operating that control system that substitutes commercial off-the-shelf hardware and operating system software for railway-domain specific proprietary product components, yet can be validated as in conformance with railway safety critical system standards. For example, a commercial personal computer or a virtual computer environment with one or more personal computers and operating systems may be substituted for proprietary railway-domain specific railway environment with two independent tasks, threads or nodes, and are configured for asymmetrical communication with other safety critical systems. Both tasks receive and verify safety critical systems input message data and security code integrity and separately generate output data responsive to the input message. With an asymmetrical communication architecture, the first task has sole capability to send safety critical system output messages including the output data but without output security code, and only the second task has the capability of generating the needed output security code. Due to redundancy and asymmetrical communications architecture, a failure of either or both tasks, software or processing capability results in failure to transmit a safety critical system output message or an output message that cannot be verified (and thus not used or trusted) by other safety critical systems that receive those unverified messages.

The present invention features a control system for a railway safety critical application system ("safety critical system"). The control system has at least one controller executing first and second tasks. The first task has an external bilateral communications interface capable of sending and receiving a safety critical systems message that is generated within a railway safety critical application system. That message includes a security code and safety critical data. The second task has an external communications interface capable of receiving but incapable of sending a safety critical systems message that is generated within the second task. The second task has a security code generator. The control system has an inter-task communications pathway coupling the first and second task. When operating the control system of the present invention the first and second tasks respectively receive an input safety critical systems message including input safety critical systems data and an input security code. They both verify the input message integrity and generate output safety critical systems data. The second task generates an output security code and sends it to the first task. Then the first task sends an output safety critical systems message including the output safety critical systems data and the second task's output security code for use within the safety critical application system.

The present invention also features a railway system comprising a plurality of control systems for controlling railway safety critical systems. The control systems are communicatively coupled to each other for receipt and transmission of safety critical systems messages respectively having safety critical data and a security code. At least some of the respective control systems each have at least one controller executing first and second tasks. The first task has an external bilateral communications interface capable of sending and receiving a safety critical systems message that is generated within another connected system. The second task has an external communications interface capable of receiving but incapable of sending a safety critical systems message that is generated within this second task. The second task has a security code generator. An inter-task communications pathway couples the first and second tasks. In operation of those respective control systems the first and second tasks respectively receive an input safety critical systems message including input safety critical systems data and an input security code; verify the input message integrity and generate output safety critical systems data. The second task generates an output security code and sends it to the first task, and the first task sends an output safety critical systems message including the output safety critical systems data and the second task's output security code, for use within the connected system.

The present invention additionally features a method for controlling safety critical railway control systems (such as interlocking systems or train control systems). The method comprises receiving with respective first and second tasks that are executed on at least one controller a safety critical systems input message that is generated within a railway train that includes a security code and safety critical data, and independently verifying the input message integrity. Next each of the tasks independently generates output safety critical systems data in response to the input message. The second task generates an output security code that is sent to the first task, which is in turn then responsible for assembling, verifying and sending an output safety critical systems message including the output safety critical systems data and the second task's output security code.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized in a railway safety critical system that substitutes commercial hardware and/or operating system software for proprietary product components, yet is validated to conform with railway safety critical system standards. In some embodiments of the present invention the safety critical system utilizes a virtual computer environment with one or more personal computers, with two independent tasks and operating systems, or other commercially available controllers and operating systems. Each computer, operating system, software language and compliler may differ for additional diversity. Both tasks receive and verify safety critical systems input message data and security code integrity and separately generate output data responsive to the input message. The separate paired tasks communicate asymmetrically. The first task has sole capability to send safety critical system output messages, including the output data and an output security code, but only the second task has the capability of generating the output security code. A failure of either computer hardware, software or processing capability results failure to transmit a safety critical system output message or transmits an output message that cannot be verified (and thus not used or trusted) by other safety critical systems that receive those unverified messages.

General Description of Train Safety Critical Systems

Figure 1:
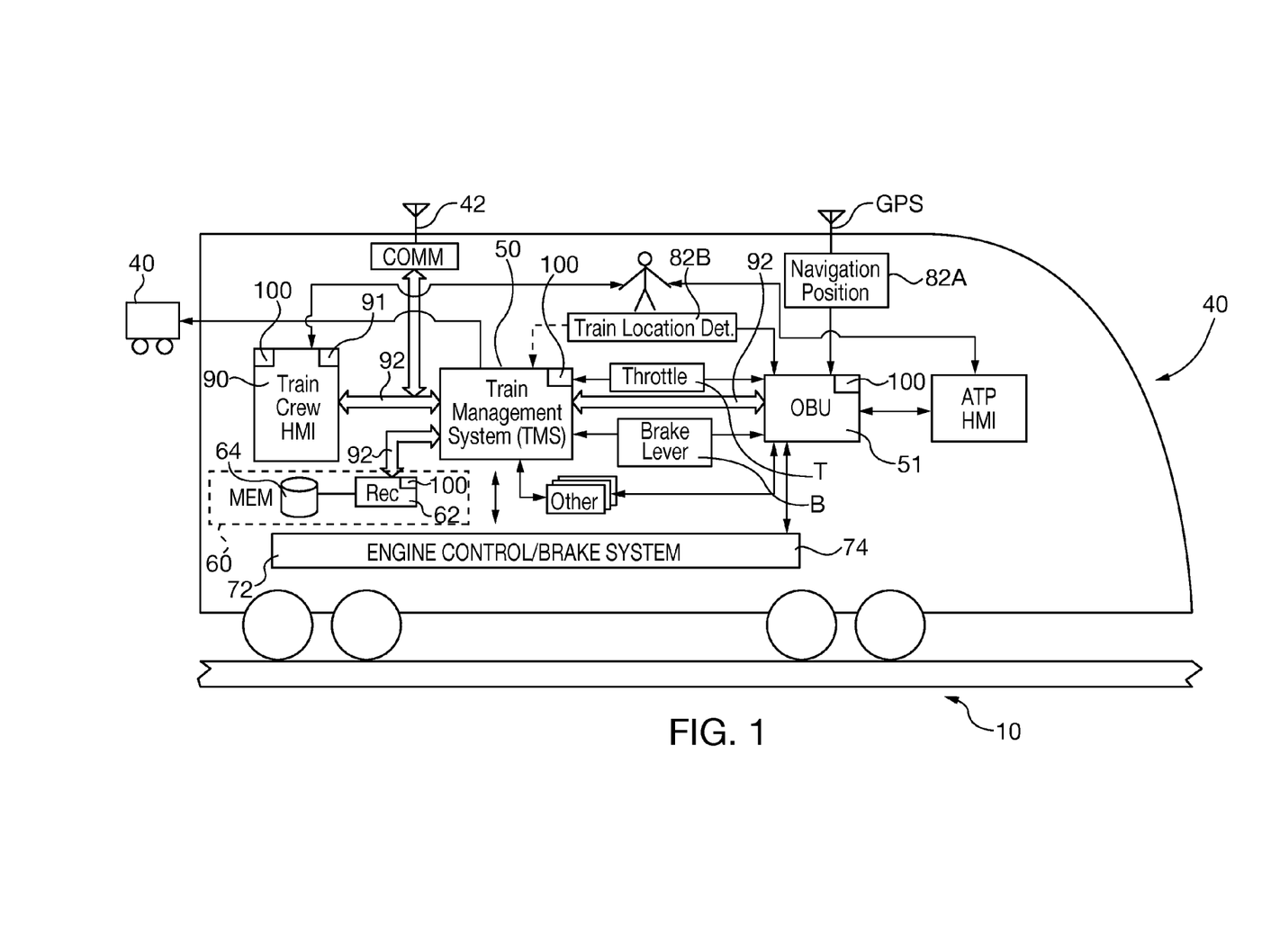
FIG. 1 is an onboard train control system general schematic drawing showing interaction of train safety critical systems of the present invention.

FIG. 1 shows generally a railway system with fixed tracks 10 and one or more trains 40. The general description herein concerning train communications, interactions of train systems including safety critical systems or the like, is of a general nature to assist in understanding how the present invention may be utilized in a railway train. Individual train networks and train systems may vary from the general exemplary description set forth herein. The train 40 includes a wireless data/communications system 42 that is capable of transmitting and receiving wireless data, which is in communication with the communications system wireless track-train-control station network (not shown).

The train transmitter and receiver communications safety critical system 42 is communicatively coupled directly or indirectly to other safety critical systems, including the onboard train management system (TMS) 50 and an onboard unit (OBU) 51 that intervenes in train speed control and braking in the event that the train operator fails to follow local track speed and stopping mandates. Typically the train 40 also has an onboard data recording system (DRS) 60 of known design, with a recorder 62 and one or more associated memory storage devices 64, for among other things acquiring, processing, organizing, formatting and recording incident data. As with any other safety critical system, the DRS 60 function may be incorporated as a subsystem within another train onboard vital system, such as the train management system (TMS) 50, rather than as a separate stand-alone device.

As also shown in FIG. 1, train 40 generally has other safety critical subsystems, including drive system 72 that provides driving force to one or more wheel carriages, and brake system 74 for altering train speed. The on-board train management system (TMS) 50 is the principal electronic control device for all other controlled train subsystems, including the navigation position system (NPS) 82A with associated train location detection system 82B that provides train position and speed information. Other subsystems include throttle control that causes the drive system 72 (e.g., more or less throttled speed) and receives commands from the TMS 50. The brake system 74 causes the brakes to brake the train 40. The brake system 74 also receives commands from the TMS 50. Other train cars and/or tandem locomotives 40' optionally may be in communication with the TMS 50 or other subsystems in train 40, such as for coordination of braking and throttle control. The train 40 also has a train crew human-machine interface (HMI) 90 that has an electronic display screen 91 and operator actuated brake B and throttle T controls (one or both of which are used by the operator depending upon the train operating conditions), so that the train operator can drive the train. The HMI 90 communicates with the TMS 50 via communications data bus 92, though other known communications pathways can be substituted for the data bus when implementing other known control system architectures. The HMI 90 communicates train operator respective throttle T and brake B control commands to the respective engine control 72 and the brake system 74.

In this exemplary embodiment of FIG. 1, each of the TMS train control system 50, the OBU 51, the data recording system (DRS) 60 and the HMI 90 have internal computer/controller platforms 100 of known design that communicates with each other via data bus 92. However the number of computer controllers, their location and their distributed functions may be altered as a matter of design choice. In this exemplary embodiment, general control of train 40 subsystems is performed by TMS 50 and the controller platform 100 therein; the intervention functions are performed by the OBU 51 and the controller platform 100 therein; the data recording functions are performed by the data recording system 60 and the controller platform 100 therein; and the HMI functions are performed by HMI 90 and the controller platform 100 therein, though any of these systems 50, 51, 60, 90 may be combined in part or in whole.

Figure 2:
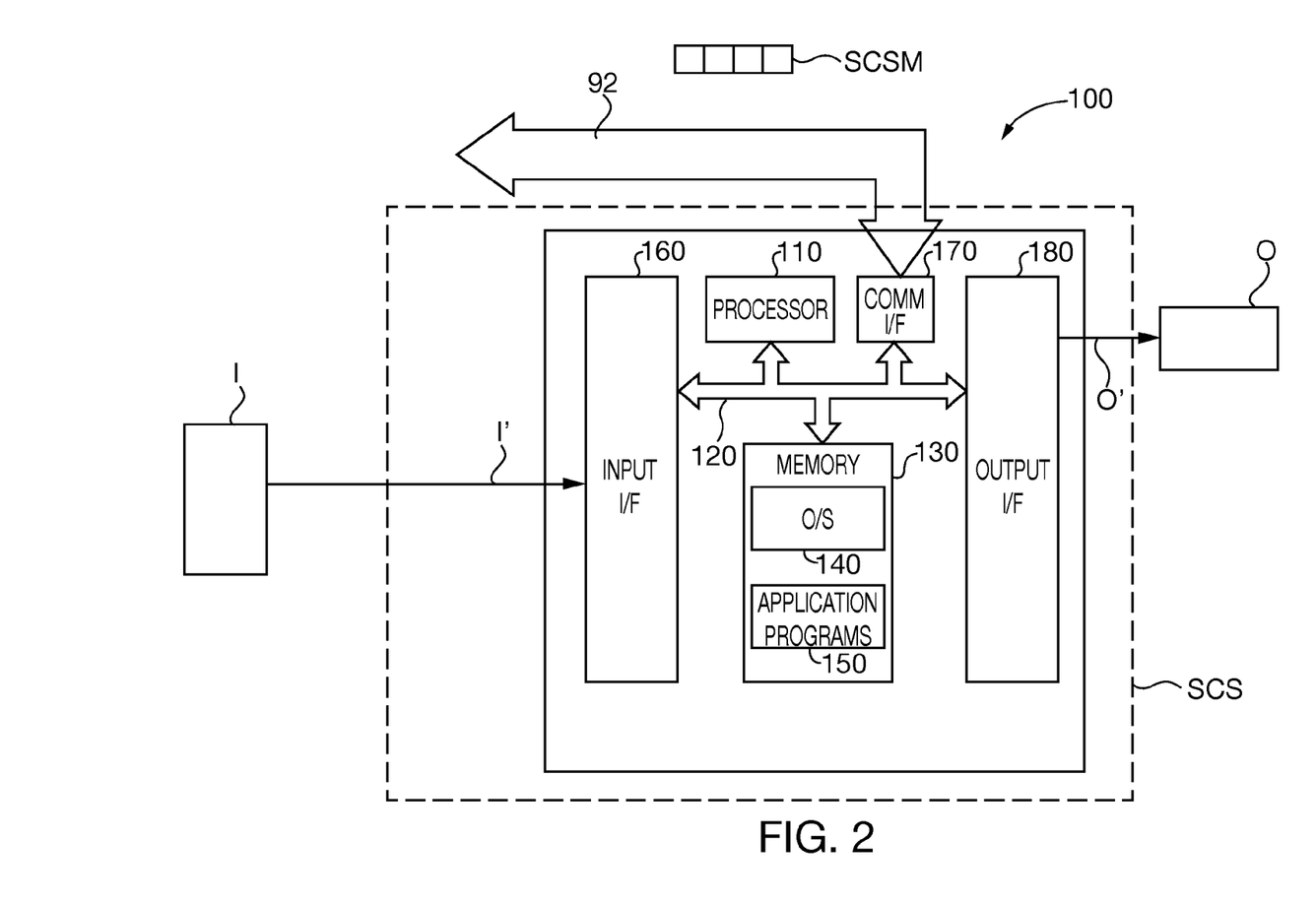
FIG. 2 is a schematic of a computer or controller of the type used in train safety critical system control systems of the present invention.

General Description of Safety Critical Railway Systems Tasks and their Communication Referring to FIG. 2, a physical or virtual controller platform 100 includes a processor 110 and a controller bus 120 in communication therewith. Processor 110 is coupled to one or more internal or external memory devices 130 that include therein operating system 140 and application program 150 software module instruction sets that are accessed and executed by the processor, and cause its respective control device (e.g., TMS 50, OBU 51, DRS 60 or HMI 90, etc.) to perform control operations over their respective associated safety critical subsystems.

While reference to an exemplary controller platform 100 architecture and implementation by software modules executed by the processor 110, it is also to be understood that the present invention may be implemented in various forms of hardware, software, firmware, special purpose processors, or a combination thereof. Preferably, aspects of the present invention are implemented in software as a program tangibly embodied on a program storage device. The program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform 100 also includes an operating system and microinstruction code. The various processes and functions described herein may be either part of the microinstruction code or part of the program (or combination thereof) which is executed via the operating system. In addition, various other peripheral devices may be connected to the computer/controller platform 100.

It is to be understood that, because some of the constituent system components and method steps depicted in the accompanying figures are preferably implemented in software, the actual connections between the system components (or the process steps) may differ depending upon the manner in which the present invention is programmed. Specifically, any of the computer platforms or devices may be interconnected using any existing or later-discovered networking technology and may also all be connected through a larger network system, such as a corporate network, metropolitan network or a global network, such as the Internet.

Computer/controller platform 100 receives input communications from one or more input devices I via respective communications pathways I' through input interface 160, that in turn can distribute the input information via the controller bus 120. Output interface 180 facilitates communication with one or more output devices O via associated communications pathways O'. The controller platform 100 also has a communications interface 170 for communication with other controllers on a shared external data bus, such as the data bus 92 that was previously described.

Figure 3:
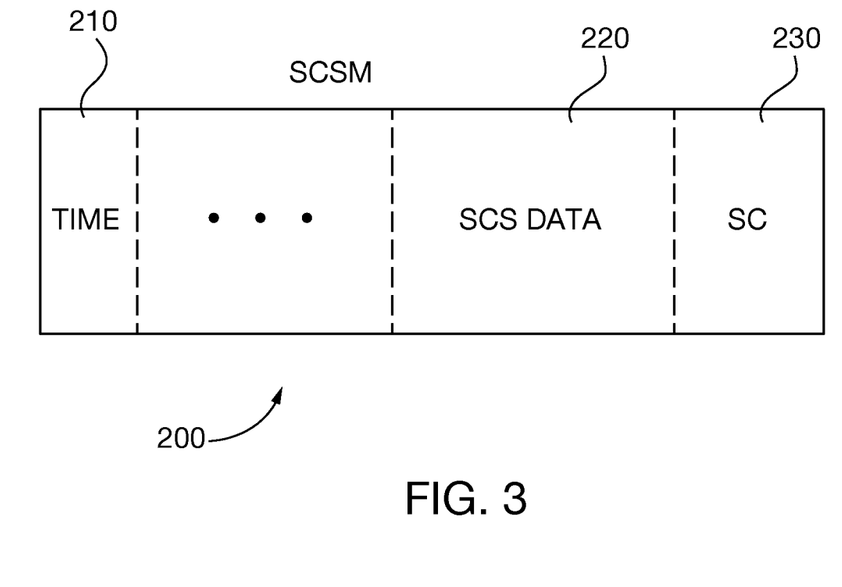
FIG. 3 is an exemplary safety critical systems message format used in the safety critical system control systems of the present invention.
Figure 4:
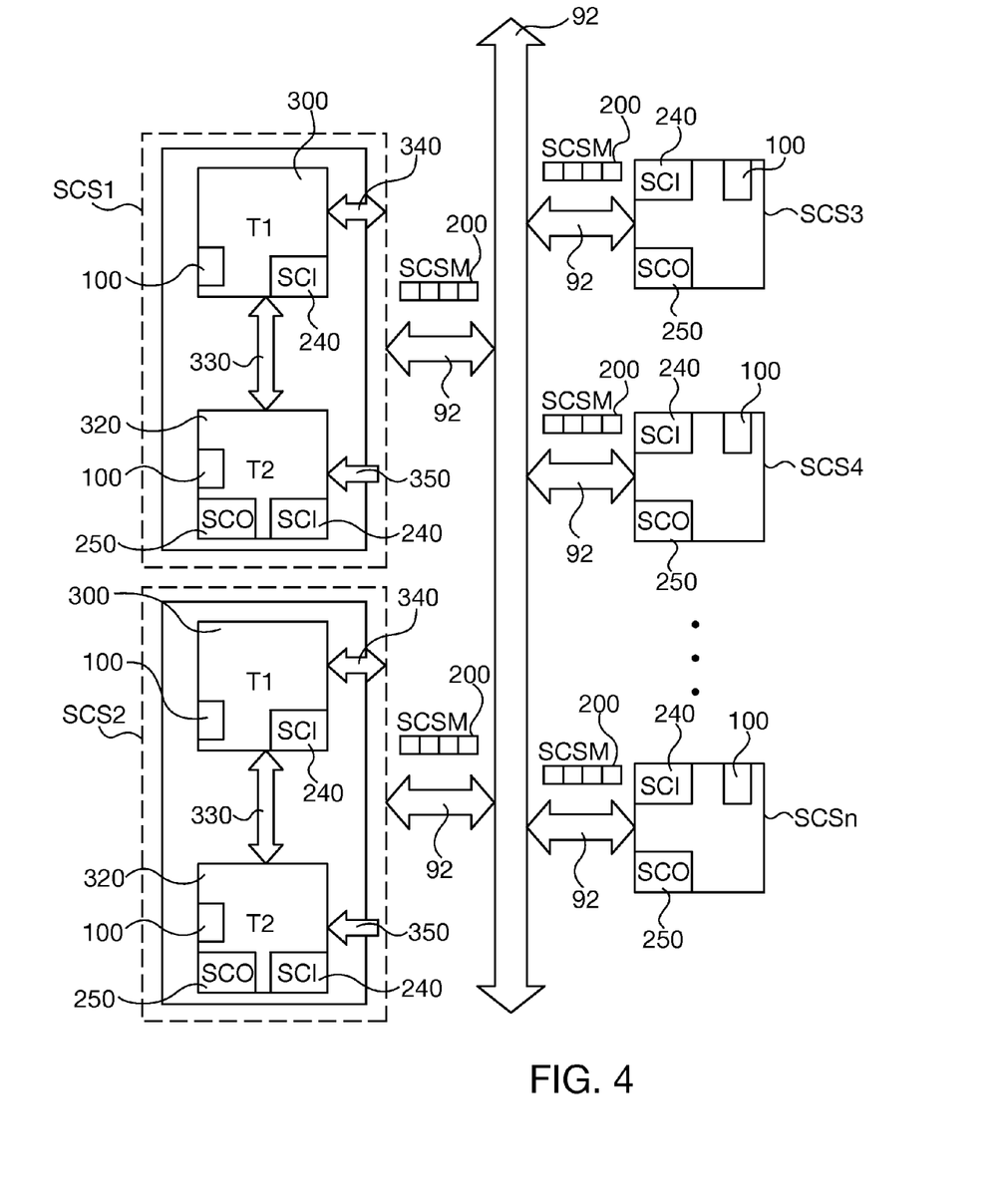
FIG. 4 is a block diagram showing communications interaction among the safety critical system control systems of the present invention.

Referring go FIGS. 2-4, communications among computer/controller platforms 100 and their respective safety critical systems (SCS1-SCSn) are accomplished via a safety critical systems message (SCSM) 200 carried on data bus 92. Each SCSM 200 is formatted and transmitted in accordance with a known protocol that is approved for safety critical data integrity in railway critical systems, including a known security code generated by known CHECK-SUM, HASH, etc. protocols. The exemplary SCSM 200 shown in FIG. 3 includes a time stamp 210, and if required a sequence number and source and destination identifiers (not shown), safety critical system data (SCS data) 220 and a security code (SC) 230. For ease of description herein, an incoming or input safety critical systems message (SCSMI) comprises safety critical input data (DI) and an input security code (SI). Similarly, an outgoing or output safety critical systems message (SCSMO) comprises safety critical output data (DO) and an output security code (SO). When a safety critical system SCS1-SCSn receives a SCSMI its data integrity is verified with a known SCI 240 analysis module within the tasks (T1, T2) that is implemented in hardware, firmware, software or any combination thereof. If the SCSMI data integrity is verified the DI are utilized by the tasks to prepare a responsive output message SCSMO including output data DO and an output security code generated in SCO 250 generation module. As with the SCI 240 module the SCO 250 module generation function is implemented in hardware, firmware, software or any combination thereof. The subsequently generated SCSMO is communicated to one or more intended recipient SCS controller platforms that in turn treat the message as a SCSMI.

Redundant Control System and Operation

In FIG. 4 the safety critical system tasks SCS1 and SCS2 respectively comprise a paired set of tasks T1 300 and T2 320 that are in bilateral communication with each other via inter-controller data interface 330. The tasks 300, 320 are running in commercially available industrial, commercial or consumer devices, such as for example industrial programmable logic controllers, separate or unitized computer/controller motherboards, or commercial off-the-shelf personal computers/motherboards. By way of further example if the tasks 300, 320 are executed literally or virtually in personal computers, they may be executed on the same or separate controllers 100, in one or more computers that housed in separate devices, combined in a common device housing, separate boards in a server rack, etc. Each of the one or more computers may comprise different hardware including separate or common controller platforms 100, and/or processors 110 and/or operating systems 140 and/or application programs 150 stored therein that are executed by the processor(s) to perform the its respective dedicated safety critical system function. The components and software used in each respective task 300, 320 may be sourced from different vendors. For example, each task 300, 320 may utilize different vendor models, versions or types of processors 110, operating systems 140 and application software 150, so as to reduce potential of a generalized vendor-wide component or software failure. In another exemplary embodiment or configuration implementation of the separate tasks T1 and T2, both are executed simultaneously and virtually in real time, in a common computer processor 100, with the respective SCI 240 and SCO 250 sub-tasks also implemented virtually.

The T1 task 300 is capable of bilateral communication with the critical system data bus 92 through communications pathway 340, which may comprise a communications port enabled in the task platform 100 communications interface 170. Task 300 has an incoming security code verification module 240 that enables it to verify data integrity of a SCSMI, but does not have the capability of generating an outgoing SCSMO security code SCO.

The T2 task 320 has an enabled outgoing security code SCO generator 250, but is incapable of transmitting an SCO and critical output data directly to the critical system data interface 92. Task 320 is only able to transmit the SCO to task 300 via the internal data interface 330: it is only capable of receiving a SCSMI through unilateral, incoming communications pathway 350 and can verify data integrity with SCI verification module 240. In other words, the T2 task 320 is incapable of transmitting directly SCSMO to the data bus 92.

Figure 5:
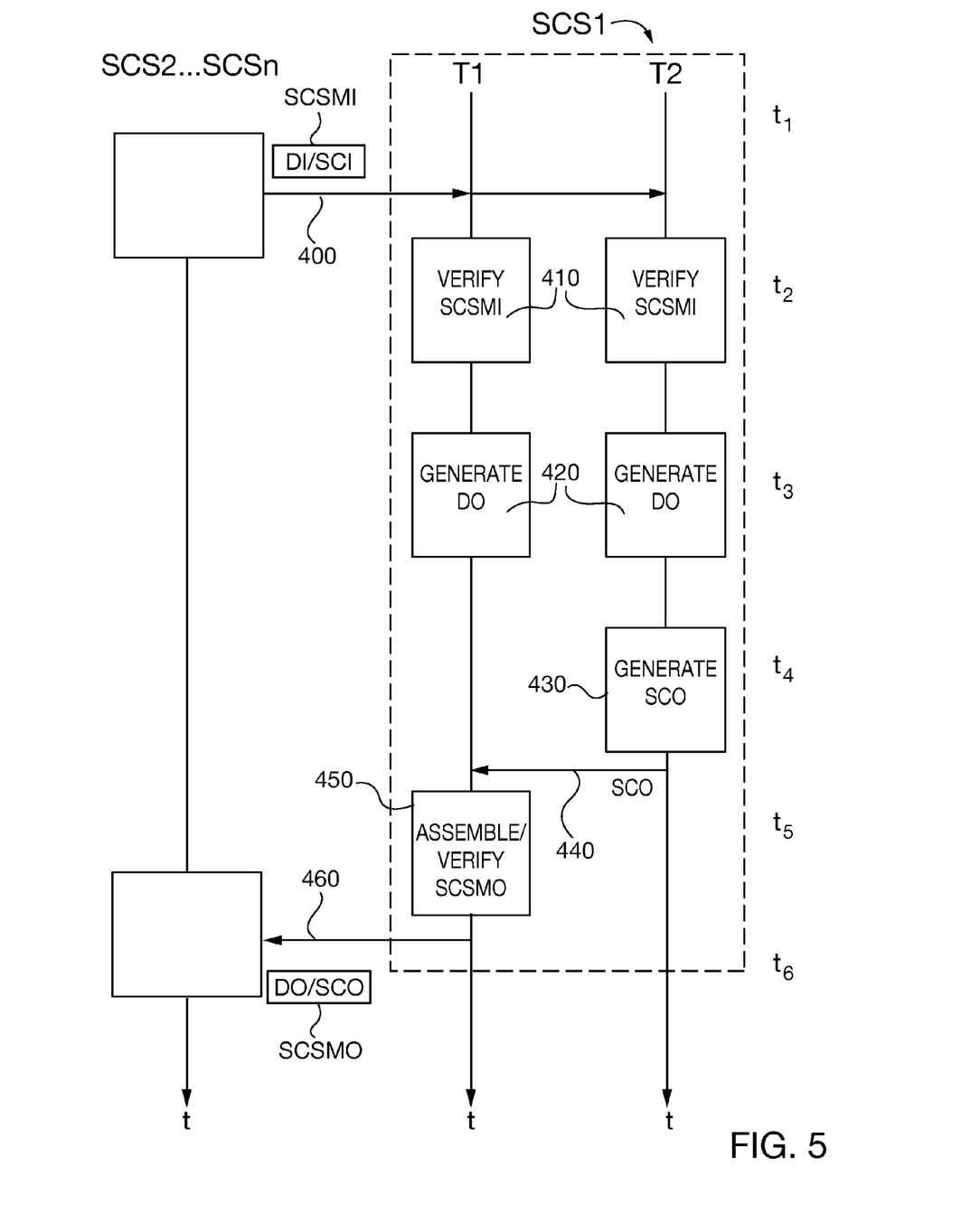
FIG. 5 is a timing diagram showing processing steps performed by an exemplary embodiment of the safety critical system control systems of the present invention.
Figure 6:
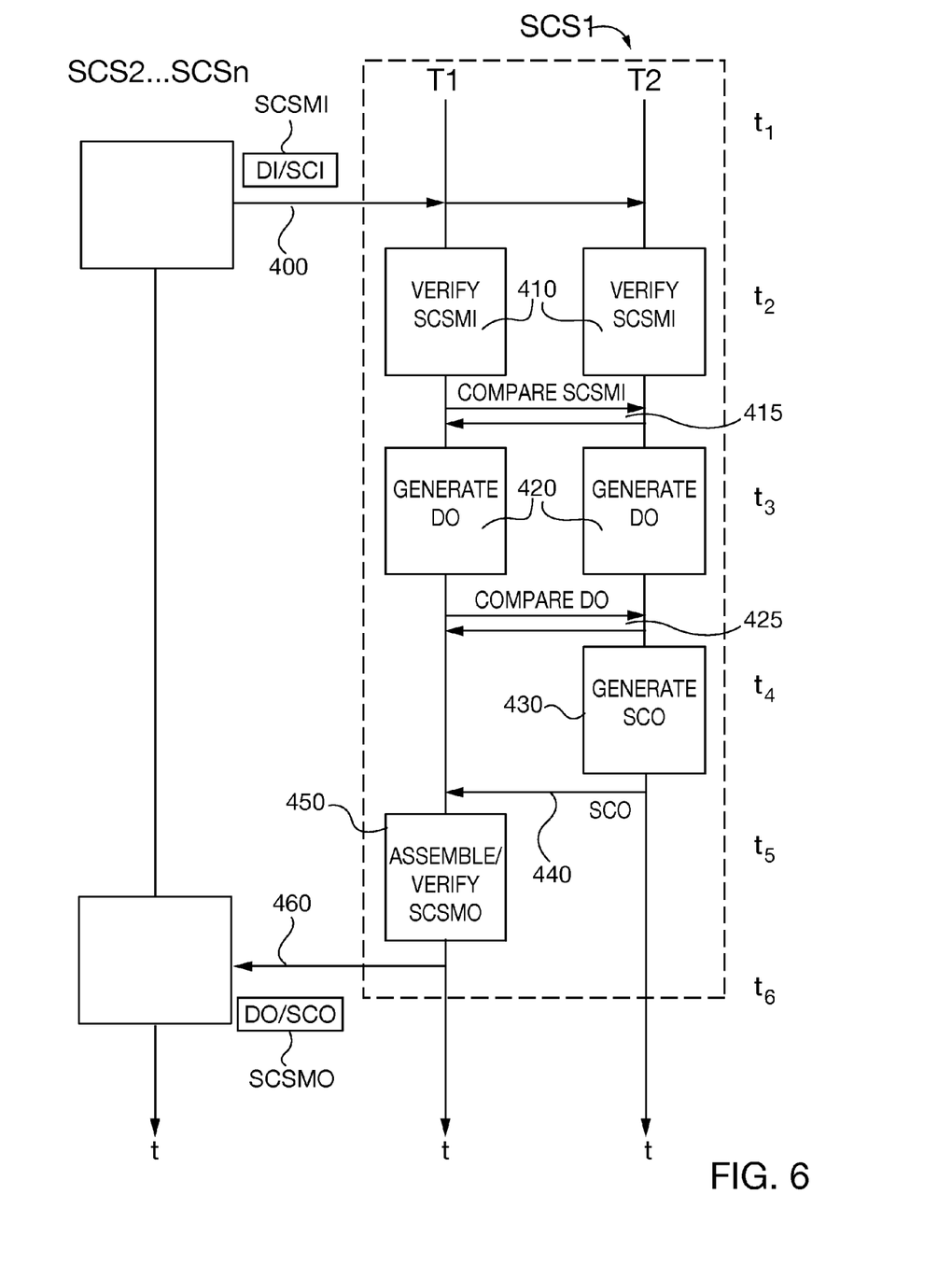
FIG. 6 is a timing diagram showing processing steps performed by another exemplary embodiment of the safety critical system control systems of the present invention.

As can be understood by reference to FIGS. 5 and 6, the respective T1 task 300 and T2 Task 320 in SCS1 are in a mutually dependent, paired relationship with asymmetric communications implementations. The first T1 task 300 is capable of receiving a SCSMI and sending a responsive SCSMO, but it cannot create the responsive message until it receives the SCO from the second T2 task 320. The T2 task is not capable of external communication to the critical system data bus 92, and must rely on the T1 task to send any messages.

In FIG. 5, one of the safety critical systems SCS2-SCSn is sending a SCSMI in step 400, comprising a DI and an SCI to SCS1 at time $t_1$, where it is received by both T1 and T2. At $t_2$, both T1 and T2 verify the SCSMI data integrity in step 410 and in step 420 both generate DO data ($t_3$) in response to the input data DI. In step 430 T2 generates the output security code SCO at time $t_4$ and sends it to T1 in step 440. In step 450 ($t_5$), T1 now assembles and optionally verifies the DO (provided by T2 in the prior step) with its own generated DO before transmitting the SCSMO through critical systems data bus 92 in step 460 ($t_6$) to other safety critical systems. If the DO do not corroborate each other during step 450 (i.e., output data is suspect) it will not transmit the SCSMO. Alternatively, if T1 is not enabled to verify the DO or if T1 and/or T2 are malfunctioning, it may transmit a corrupted SCSMO, but the corruption will be identified when the message is received by another safety critical system.

The embodiment of FIG. 6 has all of the steps and processes as the embodiment of FIG. 5, but adds a compare SCSMI verification step 415, where T1 and T2 check each other's respective verification results. If the compared results are not the same SCS1 flags a fault. This embodiment also adds a compare output data DO step 425 before T2 generates the security output code SCO in step 430. Again, if the compared results are not the same SCS1 flags a fault.

The software redundancy and mutually dependent asymmetric communication output security code generation/transmission features of the present invention railway control system for safety critical systems assures a higher safety level than any individual or independently parallel processing pair of commercial off-the-shelf controllers or personal computers. A single computer is susceptible to multiple forms of failure that would not necessarily be detected by other safety critical systems receiving SCSMOs from the failing computer. Two independent, parallel task executions T1 and T2, whether implemented on one or multiple computer platforms, feeding identical SCSMOs to other safety critical systems or that corroborate output messages prior to transmission can both be generating identical incorrect output messages. Such failure mode transmission errors are not possible with the control system of the present invention.

When analyzing possible failure modes of the safety critical systems control system of the present invention SCS1, if T1 calculates an incorrect DO and T2 calculates a correct DO and SCO, then during verification step 450 T1 will flag a mismatch between its own DO and the DO and flag an error. If T1 does not verify the SCSMO in step 450 other safety critical systems receiving that message will flag the error when they verify the received message. Conversely if the T1 DO is correct but either the T2 DO or SCO are incorrect, T2 or other SCS receiving the SCSMO will identify the error. If both T1 and T2 malfunction and generate faulty DO and/or SCO the mismatch of the DO and SCO will be noted by other critical systems that subsequently receive the corrupted message.

Although various embodiments, which incorporate the teachings of the present invention, have been shown and described in detail herein, those skilled in the art can readily devise many other varied embodiments that still incorporate these teachings.

What is claimed is:

1. A control system for a railway safety critical application system, comprising:
    at least one controller executing first and second tasks;
    the first task having a first external communications interface capable of sending and receiving a safety critical systems message within a railway safety critical application system, the message including an input security code and input safety critical data;
    the second task having a second external communications interface capable of receiving a safety critical systems message, the second task having a security code generator; and
    an inter-task communications pathway coupling the first and second tasks;
    wherein the first and second tasks respectively receive via their respective first external communications interface and second external communications interface an input safety critical systems message including input safety critical systems data and an input security code, verify the input message integrity and generate output safety critical systems data, the second task generates an output security code and sends it to the first task via the inter-task communications pathway, and the first task sends an output safety critical systems message including the output safety critical systems data and the second task output security code for use within the railway safety critical application system.

2. The system of claim 1, wherein the first and second tasks compare their respective input message integrity verifications prior to generating respective output safety critical systems data.

3. The system of claim 2, wherein the first and second tasks compare their respective output safety critical systems data.

4. The system of claim 3, wherein the first and second tasks compare their respective output safety critical systems data prior to generation of the output security code.

5. The system of claim 1, wherein the first task verifies output safety critical systems data integrity before sending the output safety critical systems message.

6. The system of claim 1, wherein the first and second tasks are executed on at least one personal computer, the tasks further executed by at least one of different operating systems or software instruction sets.

7. The system of claim 1 wherein the functions of at least one of the tasks is executed virtually.

8. A railway safety critical application system comprising the control system of claim 1.

9. A railway safety critical application system comprising the control system of claim 6.

10. A railway system comprising:
    a plurality of control systems for controlling railway safety critical systems, the control systems communicatively coupled to each other for receipt and transmission of safety critical systems messages respectively having safety critical data and a security code, the respective control systems comprising:
    at least one controller executing first and second tasks;
    the first task having a first external communications interface capable of sending and receiving a safety critical systems message that is generated within the railway system;
    the second task having a second external communications interface capable of receiving a safety critical systems message, the second task having a security code generator; and
    an inter-task communications pathway coupling the first and second tasks;
    wherein the first and second tasks respectively receive via their respective first external communications interface and second external communications interface an input safety critical systems message including input safety critical systems data and an input security code, verify the input message integrity and generate output safety critical systems data, the second task generates an output security code and sends it to the first task via the inter-task communications pathway, and the first task sends an output safety critical systems message including the output safety critical systems data and the second task output security code, for use within the railway system.

11. The railway system of claim 10, wherein the first and second tasks compare their respective input message integrity verifications prior to generating respective output safety critical systems data.

12. The railway system of claim 11, wherein the first and second tasks compare their respective output safety critical systems data.

13. The railway system of claim 12, wherein the first and second tasks compare their respective output safety critical systems data prior to generation of the output security code.

14. The railway system of claim 10, wherein the first task verifies output safety critical systems data integrity before sending the output safety critical systems message.

15. The railway system of claim 10, wherein within each respective control system the first and second tasks are executed on at least one personal computer, the tasks further executed by at least one of different operating systems or software instruction sets.

16. The railway train of claim 15, wherein each respective control system the first and second tasks are executed on computers have different hardware construction and different operating systems.

17. A method for controlling a railway safety critical application control system, comprising:
    receiving with respective first and second tasks that are executed on at least one controller a safety critical systems input message that is generated within a railway safety critical application system that includes a security code and safety critical data, and independently verifying the input message integrity;
    independently generating output safety critical systems data in response to the input message with the respective first and second tasks;
    generating an output security code only with the second task and sending the generated output security code to the first task via a first pathway; and
    assembling and sending via a second pathway different from the first pathway an output safety critical systems message including the output safety critical systems data and second task output security code with the first task.

18. The method of claim 17, further comprising comparing first and second tasks respective input message integrity verifications prior to generating respective output safety critical systems data.

19. The method of claim 18, further comprising comparing first and second tasks respective output safety critical systems data.

20. The method of claim 19, further comprising comparing first and second tasks respective output safety critical systems data prior to generating the output security code.

* * * * *